(12) United States Patent
Kratmann et al.

(10) Patent No.: US 11,274,653 B2
(45) Date of Patent: Mar. 15, 2022

(54) PROTECTIVE COVER SYSTEM

(71) Applicant: SIEMENS GAMESA RENEWABLE ENERGY A/S, Brande (DK)

(72) Inventors: Kasper Koops Kratmann, Horsens (DK); Jason Stege, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/338,602

(22) PCT Filed: Sep. 27, 2017

(86) PCT No.: PCT/EP2017/074568
§ 371 (c)(1),
(2) Date: Apr. 1, 2019

(87) PCT Pub. No.: WO2018/060299
PCT Pub. Date: Apr. 5, 2018

(65) Prior Publication Data
US 2021/0164436 A1 Jun. 3, 2021

(30) Foreign Application Priority Data
Sep. 27, 2016 (EP) ...................... 16190944

(51) Int. Cl.
*F03D 1/06* (2006.01)
(52) U.S. Cl.
CPC ........ *F03D 1/0675* (2013.01); *F05B 2230/80* (2013.01); *F05B 2230/90* (2013.01); *F05B 2240/21* (2013.01); *F05B 2260/95* (2013.01)
(58) Field of Classification Search
CPC ................ F03D 1/0675; F05B 2230/80; F05B 2230/90; F05B 2240/21; F05B 2260/95
See application file for complete search history.

(56) References Cited

U.S. PATENT DOCUMENTS

2007/0036659 A1\* 2/2007 Hibbard .................. B29C 63/22
416/233
2010/0140405 A1 6/2010 Capasso et al.
(Continued)

FOREIGN PATENT DOCUMENTS

CN 1867770 A 11/2006
CN 102458839 A 5/2012
(Continued)

OTHER PUBLICATIONS

International Search Report for PCT/EP2017/074568, filed on Sep. 27, 2017.
(Continued)

*Primary Examiner* — Aaron R Eastman
(74) *Attorney, Agent, or Firm* — Schmeiser, Olsen & Watts LLP

(57) ABSTRACT

Provided is a protective cover system including a first protective cover and a second protective cover, both include a polymer and being pre-formed into a curved shape so as to accommodate at least a part of a wind turbine blade to be protected, each of the first and second protective covers has a tip end and a root end, wherein the first protective cover includes a first overlap portion at the root end, and the second protective cover includes a second overlap portion at the tip end, wherein the shape of the first overlap portion is substantially complementary to the shape of the second overlap portion such that when overlapping the first and second overlap portions, the resulting cross section of the overlapped overlap portions substantially corresponds to the cross sections of the first or second protective covers outside the overlap portions.

9 Claims, 13 Drawing Sheets

(56) References Cited

U.S. PATENT DOCUMENTS

Figure 1:
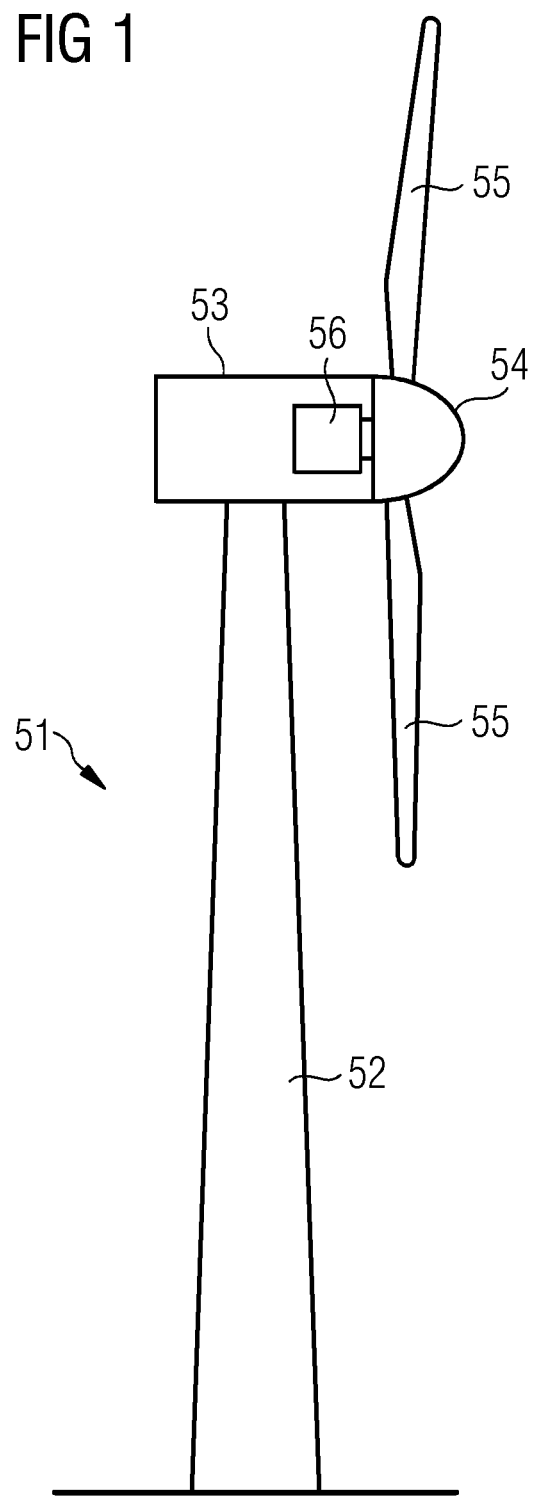

| | | | |
|---|---|---|---|
| 2011/0142678 A1 | 6/2011 | Santiago et al. | |
| 2011/0243751 A1* | 10/2011 | Fritz | F03D 15/00 |
| | | | 416/241 R |
| 2011/0299995 A1* | 12/2011 | Kootstra | F03D 1/0675 |
| | | | 416/232 |
| 2012/0034833 A1* | 2/2012 | Schaube | B64C 27/473 |
| | | | 442/172 |
| 2012/0061243 A1 | 3/2012 | Smith et al. | |
| 2012/0230830 A1 | 9/2012 | Lind et al. | |
| 2013/0101426 A1 | 4/2013 | Saitou et al. | |
| 2014/0186188 A1* | 7/2014 | Takeuchi | F03D 1/0675 |
| | | | 416/224 |
| 2015/0132140 A1 | 5/2015 | Haag | |
| 2016/0208773 A1* | 7/2016 | Theile | B32B 25/042 |
| 2017/0314532 A1* | 11/2017 | Kirkegaard | C08G 18/7671 |
| 2018/0209400 A1* | 7/2018 | Drachmann Haag | B32B 37/02 |
| 2019/0277247 A1* | 9/2019 | Kratmann | F03D 80/00 |
| 2019/0293050 A1* | 9/2019 | Ruijter | F03D 80/50 |
| 2020/0040869 A1* | 2/2020 | Stege | B32B 3/30 |
| 2020/0063718 A1* | 2/2020 | Ruijter | F03D 1/0683 |
| 2020/0166015 A1* | 5/2020 | Johansen | F03D 1/0633 |

FOREIGN PATENT DOCUMENTS

| | | |
|---|---|---|
| CN | 102536630 A | 7/2012 |
| CN | 102619676 A | 8/2012 |
| CN | 102792017 A | 11/2012 |
| CN | 104254687 A | 12/2014 |
| CN | 105492760 A | 4/2016 |
| CN | 110088466 A | 8/2019 |
| EP | 1995412 A2 | 11/2008 |
| EP | 2196309 A1 | 6/2010 |
| EP | 2497943 A1 | 9/2012 |
| EP | 2868920 A1 | 5/2015 |
| EP | 2927482 A1 | 10/2015 |
| JP | 2007170328 A | 7/2007 |
| WO | WO 2016075619 A1 | 5/2016 |

OTHER PUBLICATIONS

Written Opinion for PCT/EP2017/074568, filed on Sep. 27, 2017.
IPRP for PCT/EP2017/074568, filed on Sep. 27, 2017.
PRP for PCT/EP2017/074568, filed on Sep. 27, 2017.

* cited by examiner

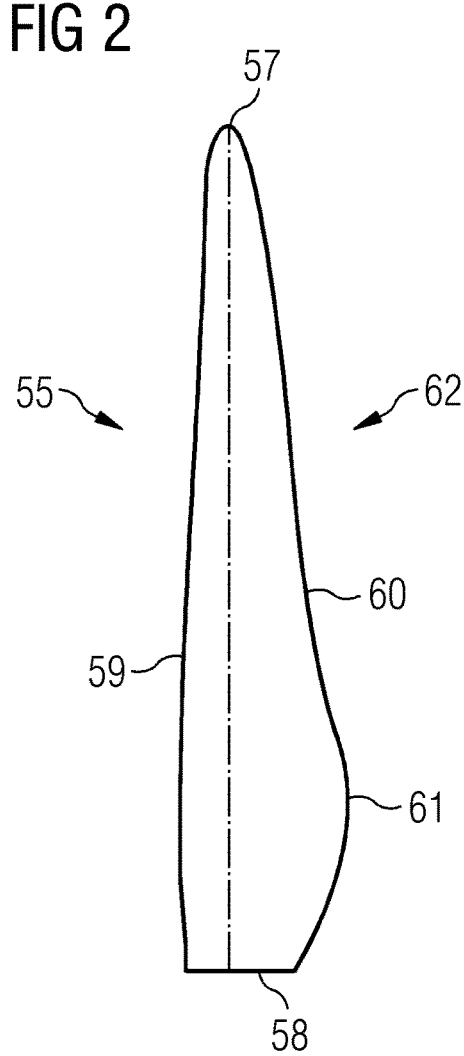
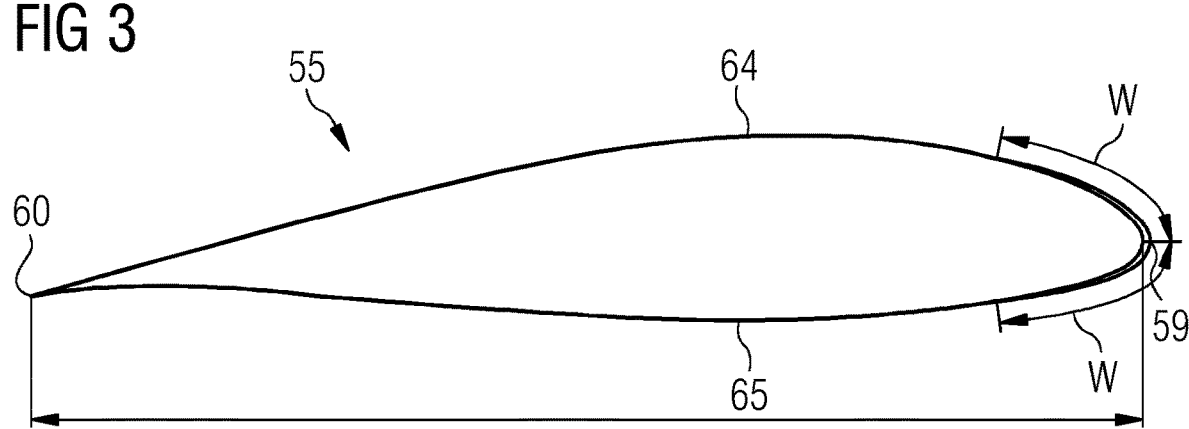

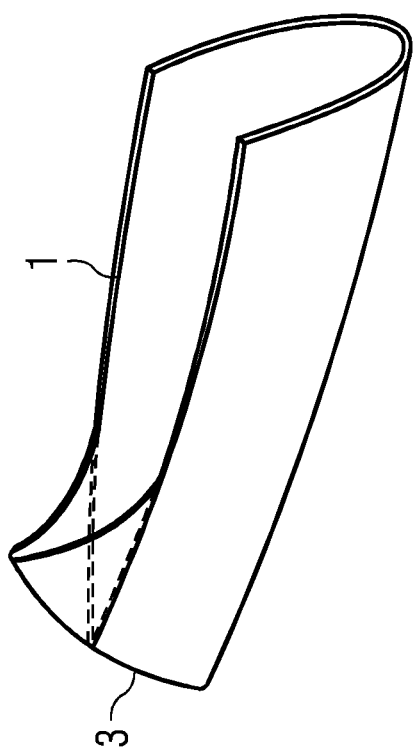
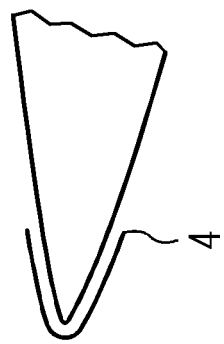
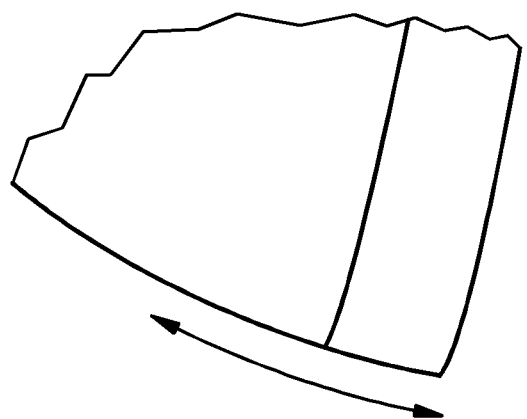
FIG 12

Root shell

Pressure side — Suction side

Tip shell

Inner shell

Pressure side — Suction side

Outer shell

Pressure side — Suction side

PROTECTIVE COVER SYSTEM

CROSS-REFERENCE TO RELATED APPLICATIONS

This application claims priority to PCT Application No. PCT/EP2017/074568, having a filing date of Sep. 27, 2017, which is based on European Application No. 16190944.5, having a filing date of Sep. 27, 2016, the entire contents both of which are hereby incorporated by reference.

FIELD OF TECHNOLOGY

The following relates to a protective cover system for protecting a leading edge of a wind turbine rotor blade from erosion, to a wind turbine rotor blade comprising such a protective cover system, and to a method for mounting such a protective cover system to a wind turbine rotor blade.

BACKGROUND

Nowadays rotor or turbine blades e.g. blades for wind, gas or steam turbines are made of fibre reinforced plastic composite materials. Erosion of the leading edge of such blades is known to occur in operation. Erosion of the leading edge of a turbine blade may reduce the efficiency of the blade and thus the power output by the turbine.

Wind turbine rotor blades, and in particular those of offshore wind turbines, are specially affected by wear which occurs where interacting with particles or droplets result in degrading of their leading edge. Erosion of the leading edge of wind turbine blades by droplet impingement wear may reduce the blade aerodynamic efficiency and thus the maximum output power of the wind turbine.

Erosion on a turbine blade may penetrate into the structural fibre reinforced laminate leading to severe failure of the turbine blade requiring repair which can prove very costly to turbine operators. This holds especially true for offshore wind turbines because their maintenance costs are extremely high.

This is why generally a surface system is foreseen on the leading edge of a wind turbine blade.

Repair procedures typically include a re-establishment of the surface systems mostly comprising filler and paint. In case of severe degradation, a lamination may be required. Different solutions are used for protecting and/or repairing leading edges of composite blades, including adhesive plastic tapes.

EP2497943 A1 discloses a wind turbine blade with an improved surface, wherein a plastic tape is arranged at specific locations of the blade to reinforce the blade surface. The lift time of erosion protection tapes will last approximately between 5-8 years, depending on the environmental conditions of the location of the wind turbine, as well as the turbine operating conditions. In general, an erosion protection tape will rupture due to heavy erosion, causing the layer left on the rotor blade to freely flutter in the wind. This fluttering will result in a loss of aerodynamic performance of the blade, as well as in the generation of additional aerodynamic noise.

Other solutions suggest erosion protection coatings applied by brush, roller, spatula or spray can. Generally, such coatings have to be applied at a certain humidity level and within a special temperature window, e.g. 20 and 25 degree Celsius. Thus, these solutions may not be used in the field, e.g. at offshore wind farms.

Further solutions suggest attaching a protective cap made of a polymer material to the forefront of a wind turbine blade during manufacturing of the blade. One drawback of these solutions is that due to the length of the protective cap needed for a larger wind turbine blade, the mounting of such a protective cap in the field is impossible or at least very difficult, especially offshore. The transport and mounting of such protective caps are extremely cost intensive.

SUMMARY

An aspect relates to a solution which allows for significantly reducing the required maintenance of the wind turbine and thus for reducing the maintenance costs compared to known protective solutions.

The embodiments relate to a protective cover system (10) for protecting a leading edge (59) of a wind turbine rotor blade (55) from erosion comprising a first protective cover (1) and a second protective cover (2). The first protective cover (1) and the second protective cover (2) comprise a polymer material. Both protective covers (1, 2) are preformed into a curved shape so as to accommodate at least a part of a wind turbine blade (55). Each of the first and second protective covers (1, 2) has a tip end (3) and a root end (4).

The first protective cover (1) comprises a first overlap portion (4a) at the root end (4) and the second protective cover (2) comprises a second overlap portion (3a) at the tip end (3). The shape of the first overlap portion (4a) at the root end (4) of the first protective cover (1) is substantially complementary to the shape of the second overlap portion (2) at the tip end (3) of the second protective cover (2) such that when overlapping these first and second overlap portions (4a, 3a), the resulting cross section of the overlapped overlap portions (4a, 3a) substantially corresponds to the cross sections of at least one of the first and second protective covers (1, 2) outside the overlap portions (4a, 3a).

The resulting cross section of the overlapped overlap portions (4a, 3a) has and ensures a substantially continuous development of the cross section throughout the first and second protective covers (1, 2). As a result, the aerodynamic properties of a wind turbine blade comprising this arrangement correspond substantially to those comprising a single protective cover with a continuous cross section development between its tip and root ends.

Smooth transitions between the first (1) and the second protective cover (2) are achieved when the protective cover system (10) is mounted on a leading edge of a blade (55). An advantage thereof is that the protective cover system (10) does not peel off and erosion of the blade may not arise or is extremely limited where the protective covers (1, 2) overlap.

Advantageously, the protective cover system according to embodiments of the present invention when mounted to a wind turbine blade avoids replenishing the leading-edge protection of the wind turbine blade repeatedly during the operational life of the blade. Tests have shown that the protective cover system according to embodiments of the invention may last on a wind turbine blade a lifetime of the blade.

In contrast to other erosion protection shields, like tapes or coatings, a protective cover (1, 2) of the protective cover system (10) according to embodiments of the present invention do not only adapt to a curved shape of a leading edge of a blade when attached to the blade but it has the curved shape already before being mounted to a curved surface. Thus, the handling of the protective covers (1, 2) during repair or manufacturing of blades (55) is easier than the handling of other erosion protective elements or shields like tapes or coatings. In addition, a tape could have the same Youngs Modulus, but not the same elongation at break as a protective cover 1, 2 according to embodiments of the present invention.

The shapes of the first and the second overlap portions (3a, 4a) are substantially complementary such that the protective cover system (10) has a substantially closed surface even if the overlap portions (3a, 4a) do not engage with each other but only touch each other. Thus, in case the first and the second protective covers (1, 2) are disposed next to one another and their overlap portions (3a, 4a) are disposed one on top of the other but not as close as possible, a very little recess will arise on the surface of the protective cover system. However, due to the substantially complementary shapes of the overlap portions (3a, 4a), the protective cover system (10) has no interruption and will still protect the blade (55) underneath.

In embodiments of the invention, the first overlap portion (4a) tapers at least partly towards the root end (4) of the first protective cover (1) and the second overlap portion (2) tapers at least partly towards the tip end (3) of the second protective cover (2). Such a tapered overlap portion will easier forgive any mounting variances.

In further embodiments of the invention, each of the first overlap portion (1) and the second overlap portion (2) comprises at least one step (5). In yet further embodiments of the invention, the step (5) is at least partly rounded.

According to embodiments of the invention, one of the first and second protective covers (1, 2) comprises a protruding element (6) in the respective first or second overlap portion (4a, 3a) and the other one of the first and second protective covers (1, 2) comprises a recess (7) in the other respective first or second overlap portion (4a, 3a), wherein the recess (7) is arranged to accommodate the protruding element (6). Allows for guiding the covers when being mounted.

According to embodiments of the invention, the recess (7) may be a hole and the protruding element (6) may be nipple-shaped.

According to further embodiments of the invention, at least one of the protective covers (1, 2) comprise an Elastomer, e.g. comprising Polyurethane or Polyethylene, a Polyurethane based Elastomer.

Each of the first and second protective covers (1, 2) comprises four corners (8). At least one of these corners (8) may be rounded. A rounded corner prevents the corner of the respective protective cover from peeling off.

According to further embodiments of the invention, the first and second protective covers (1, 2) are pre-formed into a curved shape in a lateral direction and extend from their tip end (3) to their root end (4) in a longitudinal direction, wherein at least one of the first and second protective covers (1, 2) has a centerline (C) running in the longitudinal direction, and this centerline is curved such that the first and second protective covers (1, 2) have a sagitta height (Hp).

According to embodiments of the invention, the first and second protective covers (1, 2) are pre-formed into a curved shape in a lateral direction and extend from their tip end (3) to their root end (4) in a longitudinal direction, wherein each of the first and second protective covers (1, 2) has a centerline (C) running in the longitudinal direction, and a first outer edge (9a) and a second outer edge (9b), both running in parallel to the centerline (C). The first and second protective covers (1, 2) have a thickness along their centerline (C) which tapers off towards the respective first and second outer edges (9a, 9b).

Avoiding Peeling Off of Covers.

According to embodiments of the invention, the first and second protective covers (1, 2) are pre-formed into a curved shape in a lateral direction and extend from their tip end (3) to their root end (4) in a longitudinal direction, wherein at least one of the first and second protective covers (1, 2) is curved in the longitudinal direction and/or tapers in the longitudinal direction, towards its tip end (3). Advantage: This avoids that the protective covers wrinkle when mounted to a blade. The tapering also avoids peel-off of the protective cover and provides for a continuous transition between the protective covers.

According to embodiments of the invention, a length of at least one of the first and second protective cover (1, 2) amounts to about 2000 mm at maximum, to about 1000 mm. Advantage: This avoids that the protective covers wrinkle when mounted to a blade. The tapering also avoids peel-off of the protective cover and provides for a continuous transition between the protective covers.

According to embodiments of the invention, at least one of the first and second protective cover (1, 2) comprises a printed centerline (C) on its outer surface (11) to facilitate the mounting onto a leading edge (59) of a wind turbine blade (55). This facilitates the alignment of shells and enables a quality check by optical means as well as allows for documenting quality-related information, e.g. photographs.

The wind turbine blade (55) according to embodiments of the present invention comprises a protective cover system (10) which is connected to the wind turbine blade (55) along a leading edge (59) of the blade (55). An advantage thereof is that less repair work is needed, and the maintenance costs are reduced. In addition, a combination with a de-icing or LPS is possible because of the electrical insulation property of the covers 1, 2.

The method for mounting a protective cover system (10) according to embodiments of the present invention comprises the steps of:

Providing a wind turbine blade (55), the protective cover system (10) according to one of claims 1-13 and an adhesive;

Applying the adhesive on the wind turbine blade (55) and/or on an inner surface (12) of the first and the second protective covers (1, 2);

Placing the first protective cover (1) onto the wind turbine blade (55); and

Placing the second protective cover (2) onto the wind turbine blade (55), wherein the first and the second overlap portions (4a, 3a) of the protective covers (1, 2) are arranged such that the first and the second overlap portions (3a, 4a) overlap;

Optionally, applying further adhesive between the first and the second overlap portions (4a, 3a); and Allowing the adhesive to firmly connect the first and the second protective covers (1, 2) to the wind turbine blade (55).

Embodiments of the invention comprise a protective cover system (10) according to claim 1 further comprising
a first set of protective covers, each of the protective covers of the first set of protective covers correspond to a true copy of said first protective cover (1),
a second set of protective covers, each of the protective covers of the second set of protective covers corresponds to a true copy of said second protective cover (2),
a protective tip cover, and
a protective root cover.

Possible for some blades—first set true copy of second set!—Depending on shape and/or shorter length; depending on repair length Embodiments of the invention comprise a protective cover system according to claim 6, wherein the LE radius of the first protective cover (1) is different from the LE radius of the second protective cover (2).

bending rate→LE radius
more open curvature vs., more closed curvature
only 4 diff cover types→

Embodiments of the invention comprise a protective cover system according to claim 6 or 7, wherein the first protective cover (1) has a chord length between 0.5 (2 m from tip/1 m-3 m) and 1.3 (12 m from tip/pref. 9-24 m/more pref. 10-14 m) meters and the second protective cover (2) has a chord length of about 1.3 meters or more. Outer ⅓ (∼½ to) of the length of LE—50%/50% for diff sets of shells Embodiments of the invention comprise a protective cover system according to claim 6 or 7, wherein the first protective cover (1) has a chord length between 0.5 and 1.3 meters and the second protective cover (2) has a chord length of about 1.3 meters or more.

Embodiments of the invention comprise a protective cover system according to anyone of claims 6 to 8, wherein the protective tip cover has a swept end to cover and fit the blade tip.

Pre-bend—more curved than other shells
not exact copy of blade tip but more curved—so it is stretched when mounted to the blade
Valid for all shells, but more exaggerated for tip shell
Tip covered or not covered/
open tip—easier fit to all variations of blade tips, but less erosion protection performance than closed one
close tip—better protection, but requires little variance in blade tips therefore more shell variants are needed Embodiments of the invention comprise a protective cover system according to anyone of claims 6 to 9, wherein the protective root cover features a smooth transition towards the leading edge on the root side.

root end w/o overlap portion, w/o pin hole
smooth transition towards the leading edge on the root side
Option: root shell is same as first set of shells Advantages:
for claim 6
Compared to a rigid protection shell that can be only mounted on a predefined part of the leading-edge surface, the material of which the protective covers according to embodiments of the present invention are built has a certain flexibility which allows their mounting along a much greater surface area along the leading-edge. As a result, the total number of individually designed protective covers can be reduced to a strict minimum. The resulting economic advantages with respect to production costs and logistic are quite obvious and important. Since in many cases, the surface shape along the leading-edge of a wind turbine blade changes only smoothly, it's even possible to use just two different sets of protective covers, plus a protective tip cover and a protective root cover. It is even possible to do with just two one set of protective covers, plus a protective tip cover.

for claim 7:
As stated before, the surface shape, and more precisely the leading-edge radius, along the leading-edge of a wind turbine blade changes only smoothly. Therefore, the same manufacturing process can be used to build the protective covers of the different sets. Same 3D-mould may be used for multiple blades types. This is be advantageously used to reduce furthermore the associated production costs.

BRIEF DESCRIPTION

Figure 4:
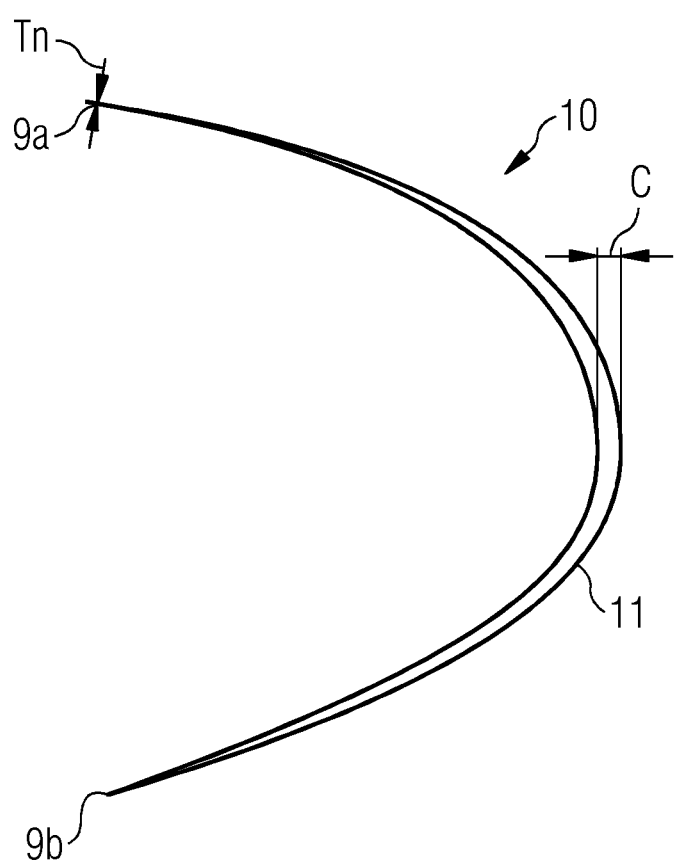
Figure 5:
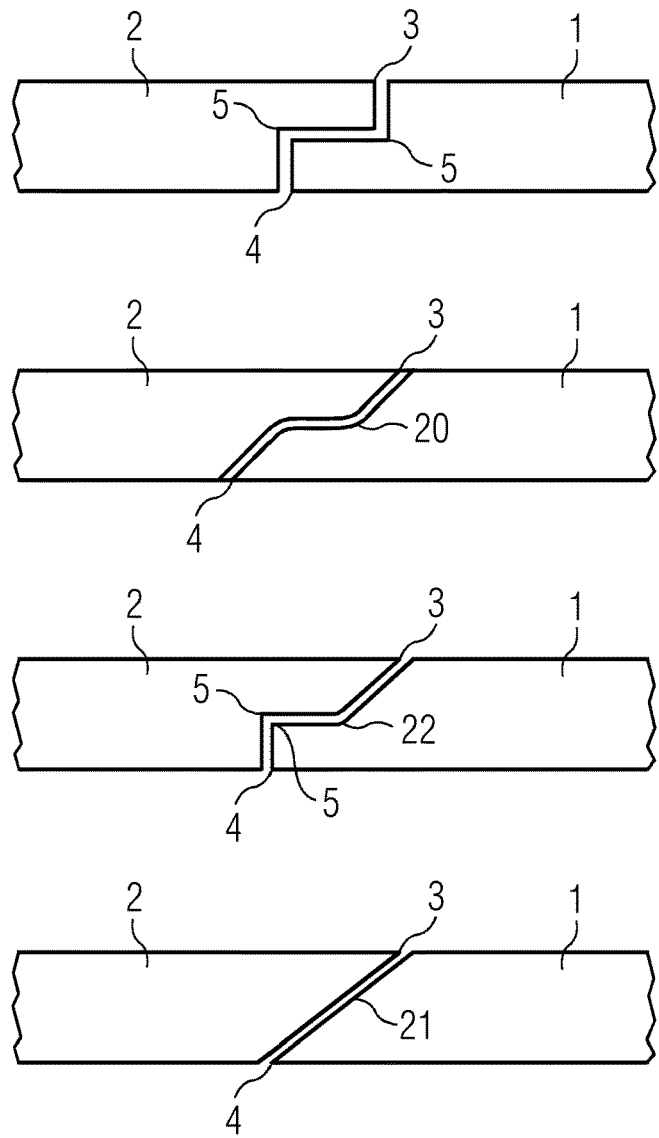
Figure 6:
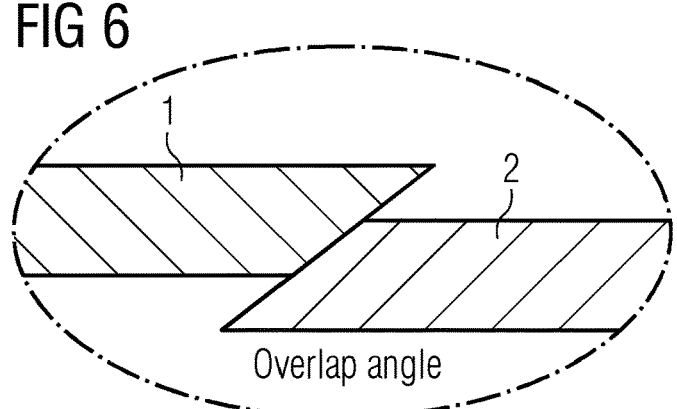
Figure 7:
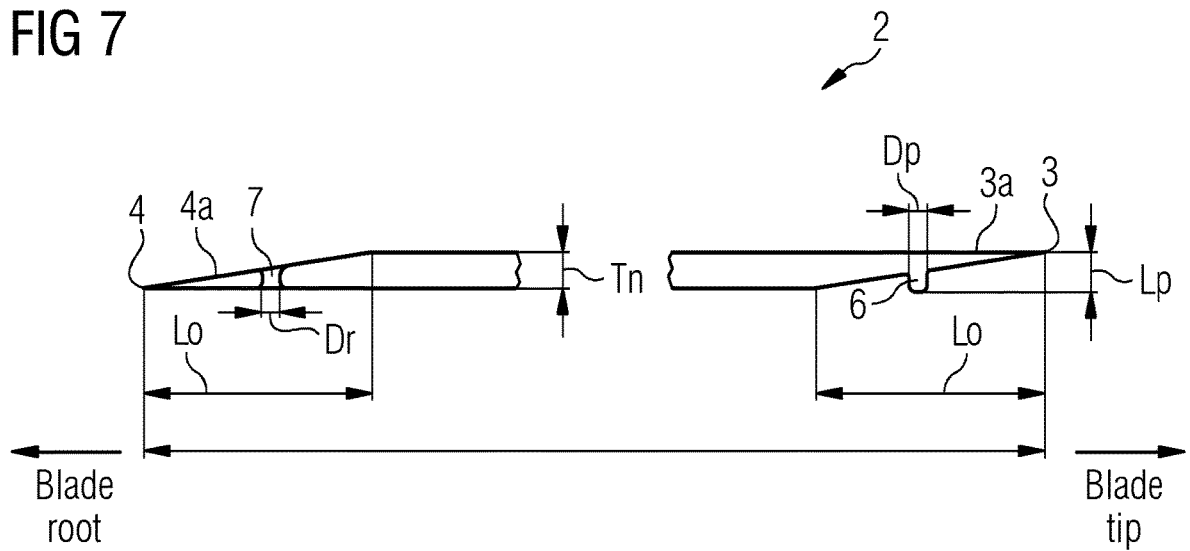
Figure 7A:
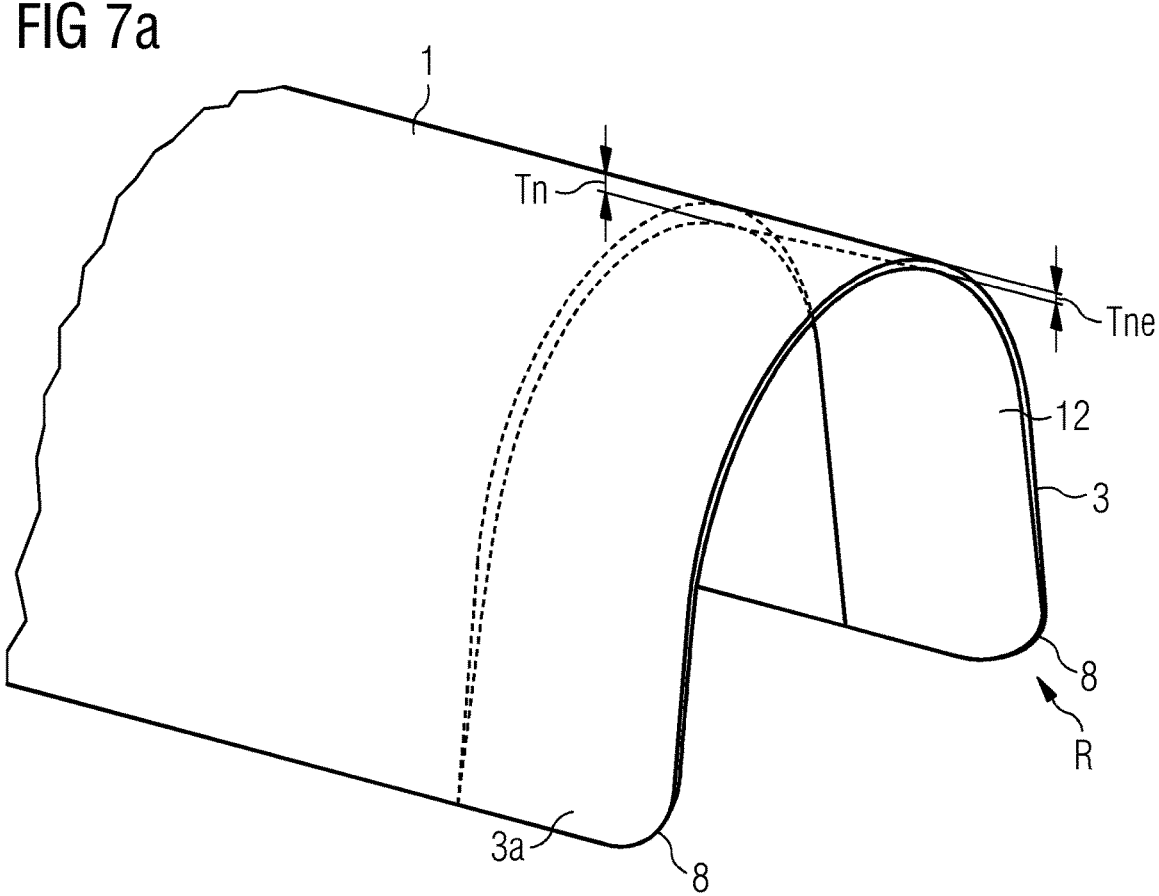
Figure 8:
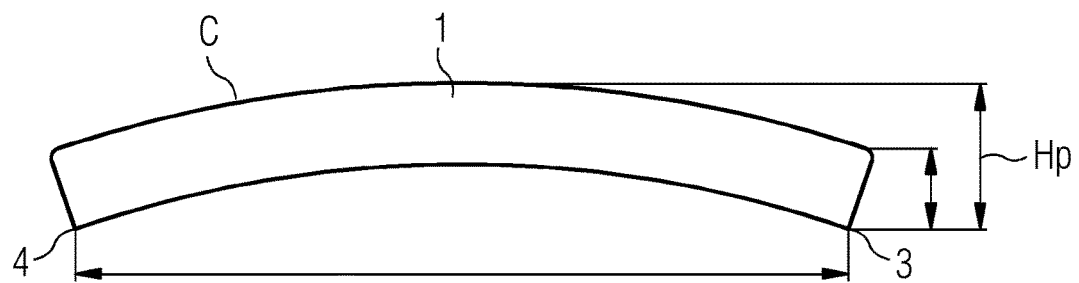
Figure 9:
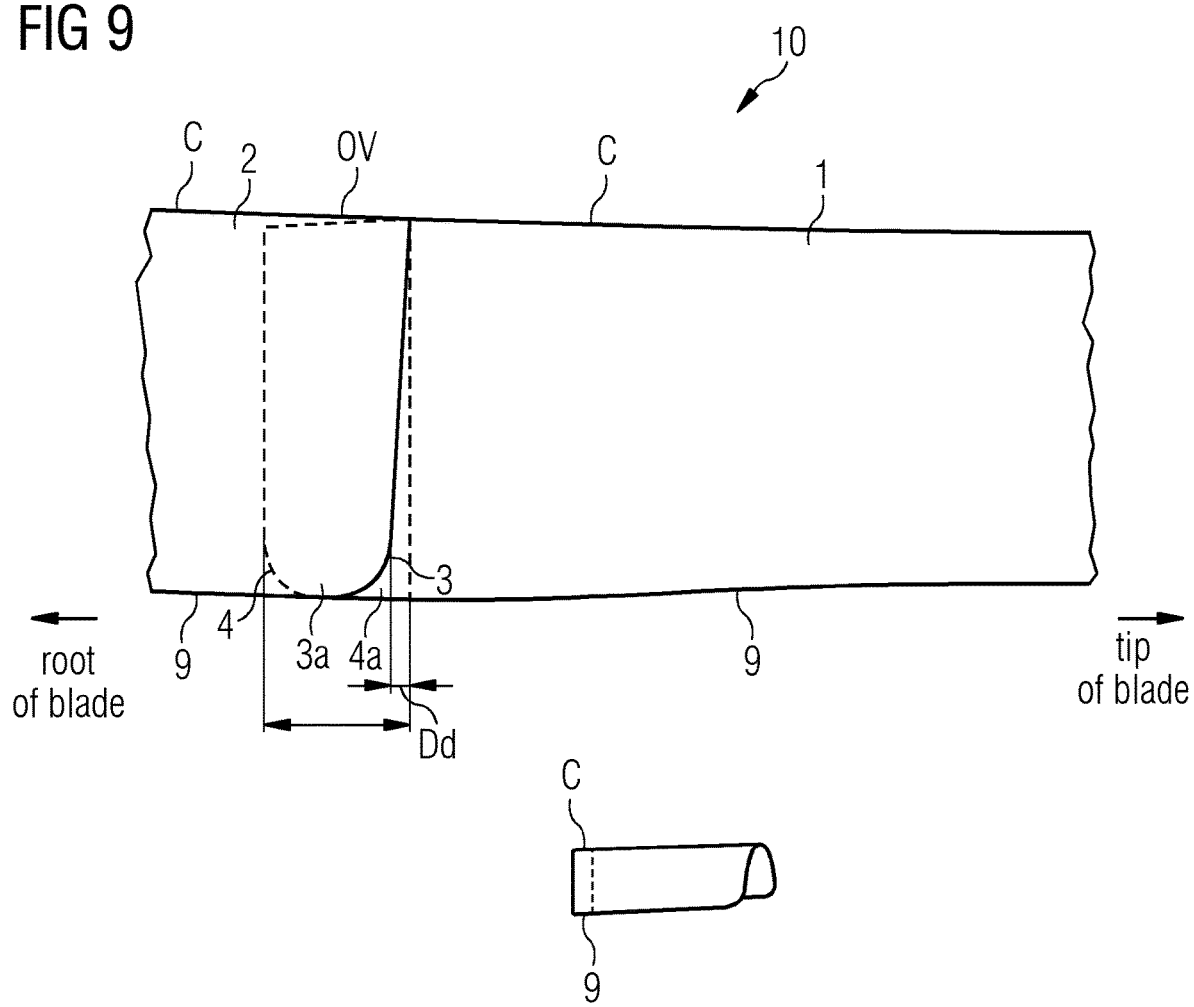
Figure 10:
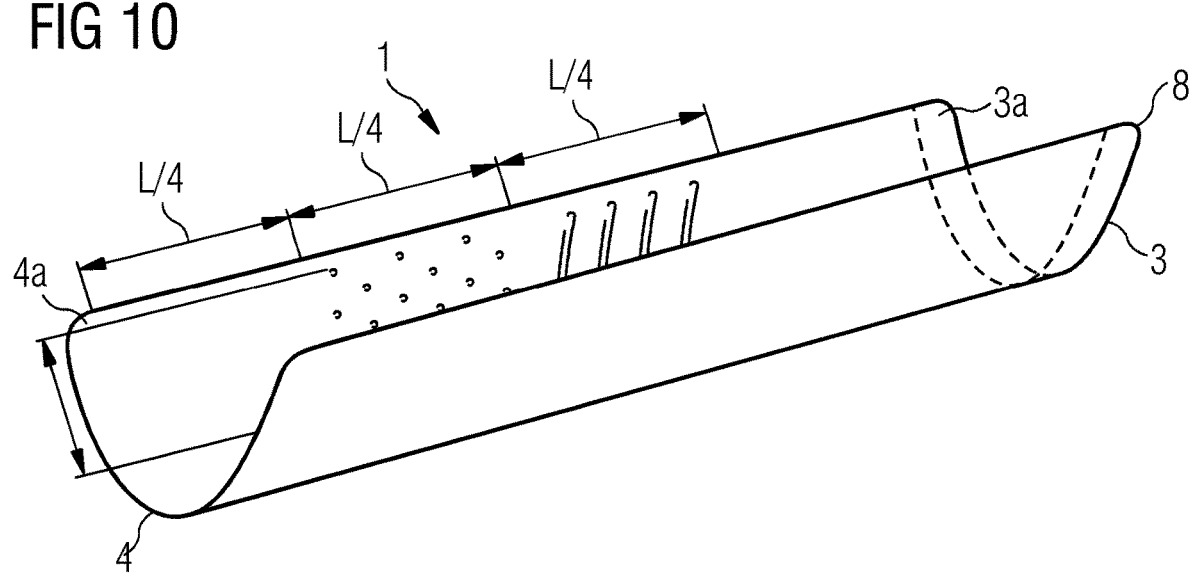
Figure 11:
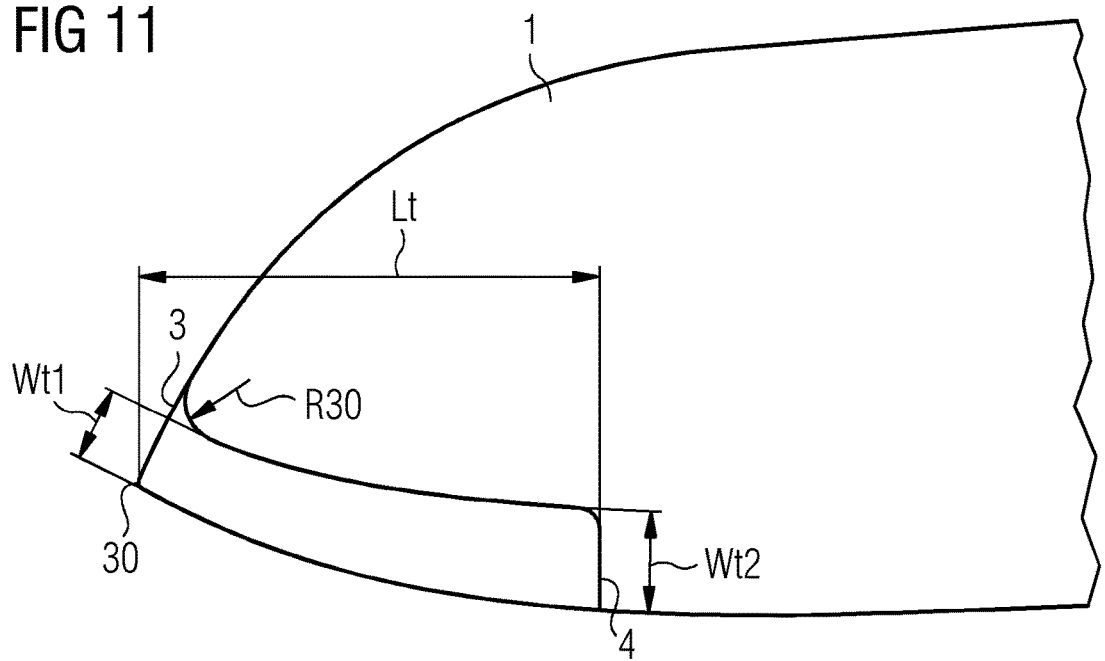
Figure 13:
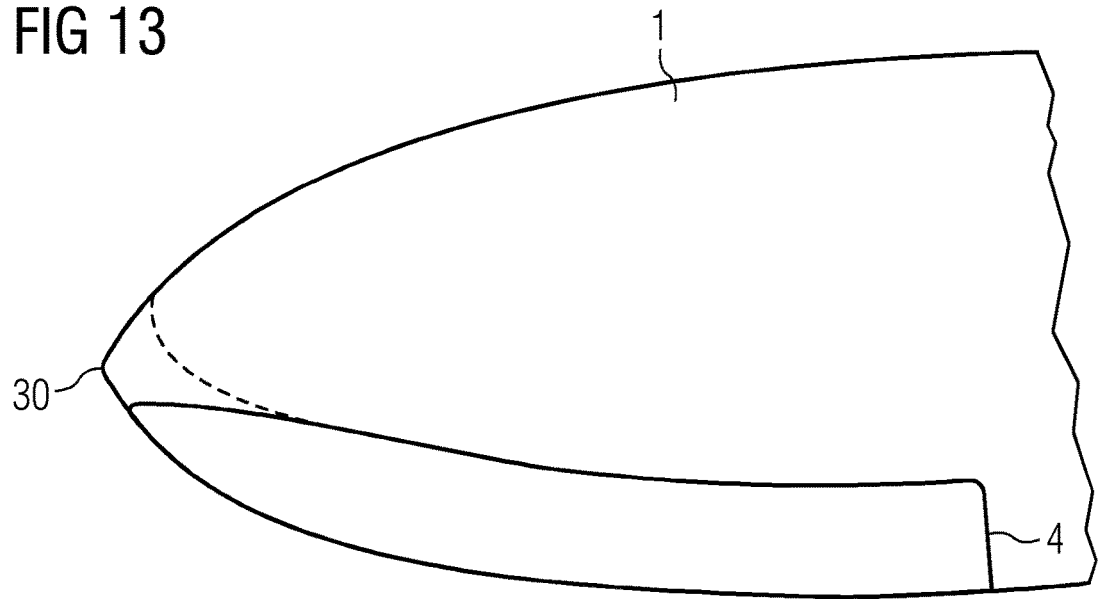
Figure 14:
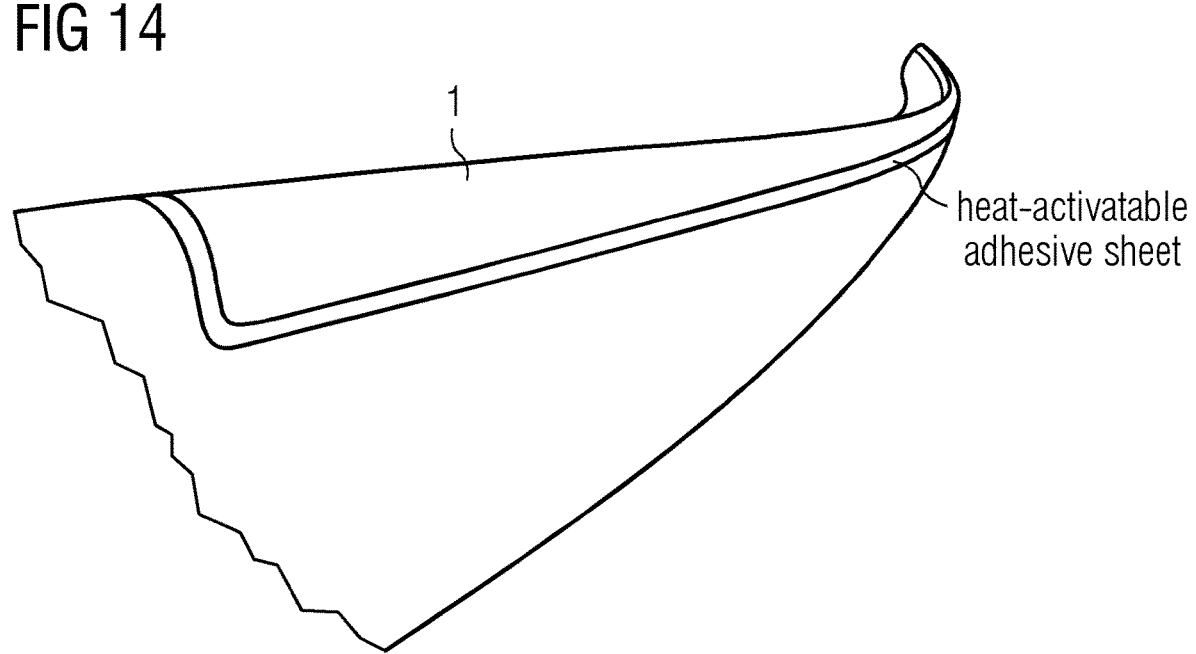
Figure 15:
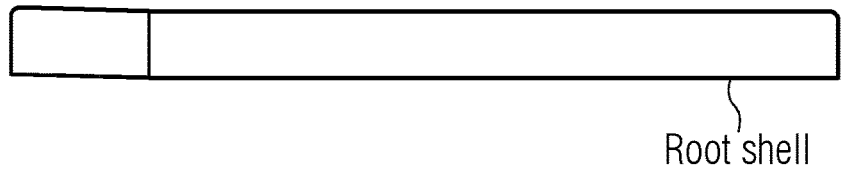
Figure 16:
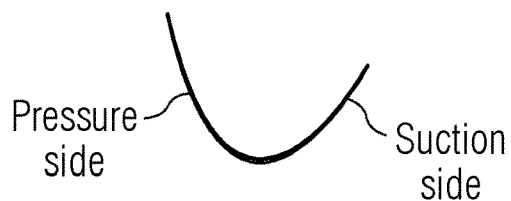
Figure 17:
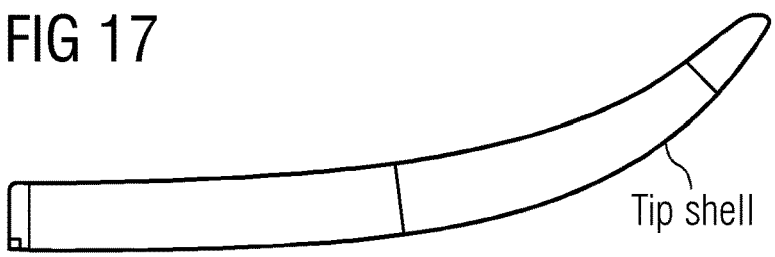
Figure 18:
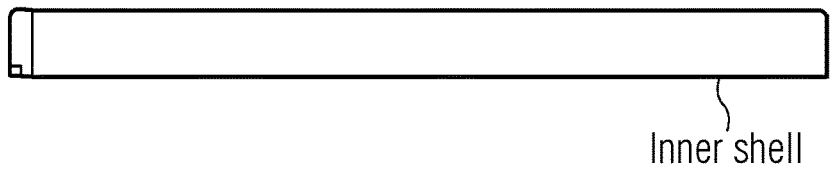
Figure 19:
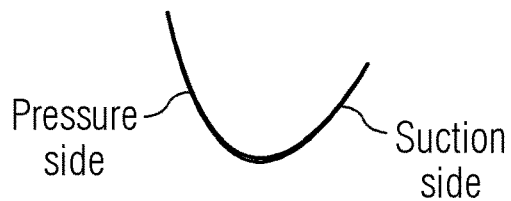
Figure 20:
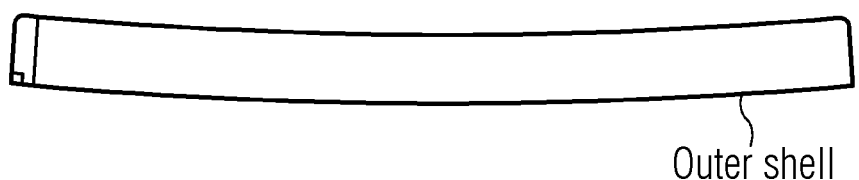
Figure 21:
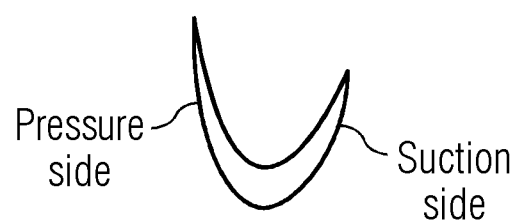
Figure 22:
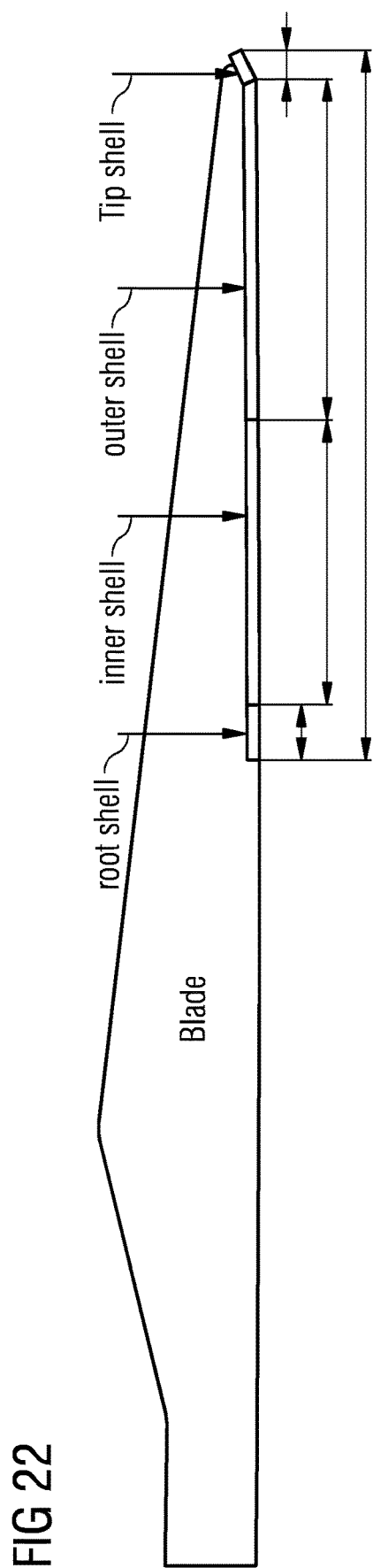
Figure 23:
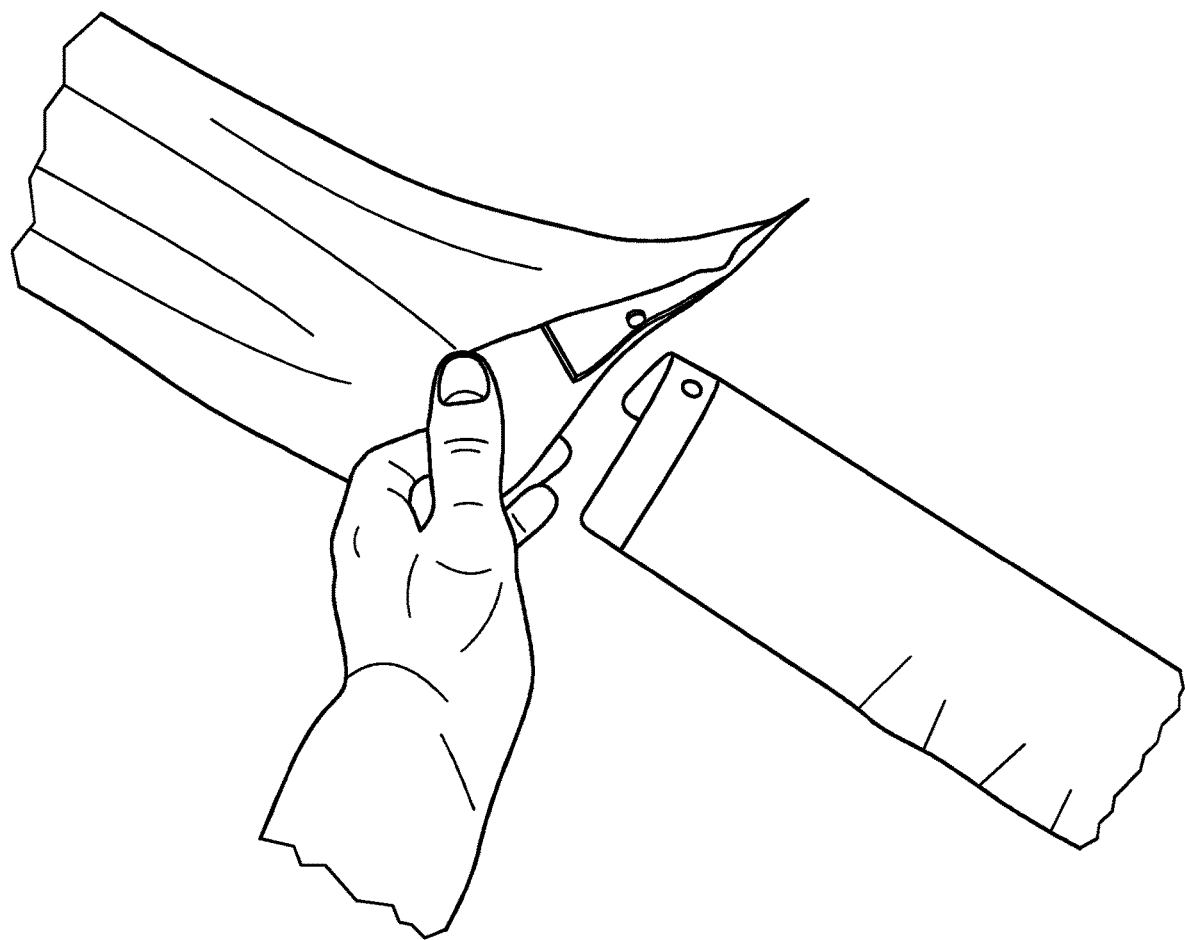

Some of the embodiments will be described in detail, with reference to the following figures, wherein like designations denote like members, wherein:

FIG. 1 shows a wind turbine;
FIG. 2 shows a plan view of a wind turbine blade;
FIG. 3 shows the profile of a wind turbine blade together with the protective cover system according to embodiments of the invention;
FIG. 4 shows a cross-sectional view of a protective cover according to embodiments of the invention;
FIG. 5 shows decline transitions at different positions of the leading edge according to embodiments of the invention;
FIG. 6 shows a detailed view of a transition according to embodiments of the invention;
FIG. 7 shows overlap portions of a protective cover according to embodiments of the invention;
FIG. 7a shows an end of the protective cover according to embodiments of the invention;
FIG. 8 shows a height of a shell according to embodiments of the invention;
FIG. 9 shows a protective cover system according to embodiments of the invention;
FIG. 10 shows bondline features of the protective cover according to embodiments of the invention;
FIG. 11 shows a tailored tip of the protective cover according to embodiments of the invention;
FIG. 12 shows an alternative tip of the protective cover according to embodiments of the invention;
FIG. 13 shows an embodiment of the protective cover according to embodiments of the invention;
FIG. 14 shows an embodiment of the protective cover according to embodiments of the invention;
FIG. 15 shows a root shell according to embodiments of the invention;
FIG. 16 show a pressure side and a suction side according to embodiments of the invention;
FIG. 17 shows a tip shell according to embodiments of the invention;
FIG. 18 shows an inner shell according to embodiments of the invention;
FIG. 19 shows a pressure side and a suction side according to embodiments of the invention;
FIG. 20 shows an outer shell according to embodiments of the invention;
FIG. 21 shows a pressure side and a suction side according to embodiments of the invention;
FIG. 22 shows a rotor blade according to embodiments of the invention; and
FIG. 23 shows how flexible the protective covers may be.

DETAILED DESCRIPTION

A "wind turbine rotor blade" may also be referred to as "wind turbine blade". A "protective cover" for protecting a leading edge of a wind turbine blade from erosion may also be referred to as "shell" or "shield".

The "protective cover" according to embodiments of the present invention is preformed. The protective cover is brought into a curved shape before being mounted. It may be machined. It is pre-casted. The term "preformed" may also be referred to as pre-shaped. According to embodiments of the present invention, the "protective cover" is pre-shaped into a curved shape so as to accommodate at least a part of a wind turbine blade (55). The "curved shape" may also be described as a channel-like shape or as a substantially parabolic channel.

It is known in the art to cast a male part on the blade by use of a male mold. The resulting bond may be of superior quality. In contrast to this concept, a female mound may be used in addition to the male mold to pre-cast the first and second protective covers (1, 2) instead of casting over the blade (55) with one or more protective covers (1, 2).

Covers of an Elastomeric Polyurethane are preferred. This may be a rubbery, elastic and flexible material to allow the protective shell to be easily form-fitted to a wind turbine blade surface and to provide it with sufficient elasticity so as to dampen the impact of erosive influences.

The protective cover may be flexible. In other words, it may have some flexibility. That means the protective cover may be flexible in such a way that it is less flexible than a tape but more flexible than a stiff component. The advantage of a preformed but flexible protective cover is on the one hand a curved shape which facilitates handling of the cover and provides for a good fit to a curved surface, and on the other hand the fact that the protective cover may easily adapt to a range of differently curved surfaces, e.g. at different locations along a leading edge of a wind turbine blade. In other words, a preformed and flexible protective cover, e.g. made of a Polyurethane based Elastomer, may adapt to different curved surfaces having a range of different bending rates (angle) in a predetermined range of bending rates.

To keep the protective covers 1,2 on the blade 55 even after being struck by a relatively large foreign object, such as a bird or an ice fragment, without a protective cover 1,2 peeling off, the protective cover system 10 is bonded to the blade 55, e.g. by means of a heat-activatable adhesive. In so doing, the adhesive may be heated, e.g. by a heating blanket or a vacuum heating blanket.

FIG. 1 shows a typical wind turbine (51) comprising a tower (52), a nacelle (53), a generator (56), and blades (55). The blades (55) are attached to a hub (54). They capture the energy of the wind, spinning a generator (56) in the nacelle (53). The tower (52) comprises the electrical conduits, supports the nacelle (53), and provides access to the nacelle (53) for maintenance.

FIG. 2 shows a plan view of a wind turbine rotor blade (55) comprising a tip (57) and a root (58), a leading edge (59) and a trailing edge (60). The rotor blade (55) further comprises a shoulder (61) near the blade root (58) and an airfoil portion (62).

FIG. 3 shows the profile of a wind turbine rotor blade 55 including a leading edge 59, a trailing edge 60 as well as the suction and the pressure sides 65, 64 between the leading and the trailing edges 59, 60. The profile shown in FIG. 3 further comprises a protective cover system according to embodiments of the present invention which is positioned along the leading edge 59 of the rotor blade 55.

FIG. 4 shows the protective cover system 10 for protecting a leading edge 59 of a wind turbine blade 55 from erosion comprises a first protective cover and a second protective cove. The first and the second protective covers 1, 2 comprise a polymer material. The covers 1, 2 are preformed into a curved shape so as to accommodate at least a part of a wind turbine blade 55, especially along the leading edge 59 of the blade 55.

FIG. 5 shows that each of the first and second protective covers 1, 2 has a tip end 3 and a root end 4. The first protective cover 1 comprises a first overlap portion 4*a* at the root end 4 and the second protective cover 2 comprises a second overlap portion 3*a* at the tip end 3*a*, as shown in FIG. 7. The shape of the first overlap portion 4*a* at the root end 4 of the first protective cover 1 is substantially complementary to the shape of the second overlap portion 3*a* at the tip end 3 of the second protective cover 2 such that when overlapping these first and second overlap portions 4*a*, 3*a*, the resulting cross section of the overlapped overlap portions 4*a*, 3*a* substantially correspond to the cross sections of at least one of the first and second protective covers outside the overlap portions.

The wind turbine blade comprises a protective cover system according to embodiments of the invention, wherein the protective cover system is connected to the wind turbine blade along a leading edge of this blade.

The method for mounting a protective system to a leading edge 59 of a wind turbine rotor blade 55 from erosion, the method comprises the steps of:

Providing a wind turbine blade, a first and a second protective cover according to embodiments of the invention, and an adhesive;

Applying the adhesive on the wind turbine blade and/or on an inner surface of the first and second protective cover;

Placing the first protective cover onto the wind turbine blade;

Placing the second protective cover onto the wind turbine blade, wherein the step of placing the second protective cover onto the wind turbine blade involves arranging the first and second overlap portions such that these first and second overlap portions overlap;

Optionally, applying further adhesive between the first overlap portion and the second overlap portion; and Allowing the adhesive to firmly connect the first and second protective cover to the wind turbine blade.

The embodiments are directed towards having a plastic shell 1, 2 that is bonded to the outer surface of the blade 55, more specific of the leading edge 59. The shell 1, 2 is referred herein to as protective cover. It may have a width W of +/−100 mm with respect to the leading edge 59 of the wind turbine blade 55, see FIG. 3.

The shell may be made of a polymer comprising polyurethane and a further component. The shell is a curved protective plate in the shape of a parabolic channel. It is designed to be mounted lengthwise along the leading edge of a wind turbine blade. The shell is moulded in a moulding process. The shell is pre-moulded but still pliable enough to provide a tight fit to the turbine blade.

The shell system comprises a first shell and a second shell. Each shell has two short edges, herein also referred to as tip end and root end 3, 4 and two long edges, herein also referred to as outer edges. The long edges are longer than the short edges. The first short edge 4 is located at one end of the parabolic channel, and the second short edge is located at the opposite end of the parabolic channel. The two long edges 9 are perpendicular to the two short edges.

The shell has a centerline C running lengthwise along the substantially parabolic channel in parallel to the long edges 9. The thickness Tn of the shell is greatest along the centerline C and gradually diminishes toward the two long edges 9. The thickness Tn may be 3 mm at the centerline C, see FIG. 4.

Overlap section: A shell system comprises at least two of above-mentioned shells 1, 2 touching one another at their short edges 3, 4. The shells may be connected to each other or interconnected by various means, e.g. by edge chamfer and protrusion 6, see FIG. 7. The protrusion 6 can be a guiding nipple.

The overlap portions 3a, 4a may have a length Lo of 30 mm in longitudinal direction of the protective cover 1, 2. The protrusion 6 may have a diameter Dp of 2 mm and the recess 7 may also have diameter Dr of 2 mm. The length Lp of the protrusion may be 3 mm, see FIG. 7.

The shells may be interconnected by means of connecting elements 5, 20, 21 that serve for a guiding/connecting of the two shells 1, 2. Mechanical interlocking between the shells 1, 2 is achieved by having connecting elements 5, 20, 21 that have a nipple shape. This shape reduces stress concentration for the connecting element 5, 20, 21.

Transition consideration: an internal chamfer results in no exposure for the blade. A stepwise decline transition provides thickness and strength which prolong the lifetime of the cover system.

Different decline transitions at different positions of the leading edge are possible, e.g. step-like connecting elements 5 at the leading edge (that means at the Centerline C) of the shell 1, 2), step-like connecting elements 20 having rounded edges onto a width of the shell of +/−50 mm from the Leading edge (Centerline C) and tapered connecting elements 21 from +/−50 mm on to a width of +/−100 m (that means until the outer edges 9, 9a, 9b), see FIG. 5 and FIG. 6.

The blade chord length is decisive of the aero dynamic property—therefore it needs to be as thin as possible. The thickness Tne at an end 4 of the shell may be around 0.05 mm. Corner rounding of corner 8 with a radius R5 help avoiding peeling off of the shell, see FIG. 7a.

At an end 3, 4 in lengthwise direction of the shell, the overlap area 3a, 4a may have a length of 20-40 mm, such as 30 mm, in one embodiment. The thickness of the shell may diminish in the overlap area to a very small thickness in the range of 0.03 mm to 0.07 mm, to about 0.05 mm.

The shell may have a peel height Hp, referred to in Danish language as Peelhejde (in English language Sagitta height). That means the shell 1, 2 may be curved with a radius R2, that means the centerline C is curved. see FIG. 8.

It is known to extrude plastic elements. The embodiments are directed towards overcoming the disadvantage of having extruded element.

Having a sagitta height Hp enables the shells to be drapable. The height difference between an outer end of the shell and a position at the centerline in the middle of the shell may be 3 to 7 mm, about 5 mm.

The sagitta height Hp is achieved during the manufacturing of the shell. Each of the shells will be moulded as one piece. Another advantage of casting the shells is that each shell can be tailored.

The protective cover system 10 comprising a first and a second protective cover 1, 2 (first and second shell) may have an open angle at the Overlap OV. That means the angle between centerline C and root or tip end 3, 4 is smaller than 90 degrees and the angle between outer edge 9 and root or tip end 3, 4 is greater than 90 degrees. At the outer edge 9 the distance Dd may be 3 mm, see FIG. 9.

Each overlap influences the aerodynamic performance of the blade. It is important to avoid excess overlap and thereby material. Therefore, the overlap is less than 30 mm.

Bondline Features: Indentation, e.g. with 20 mm spacing in between the indentations, on the inner surface ensure a better bonding due to the fact that the indentation entrap glue, see FIG. 10.

A tailored tip as shown in FIG. 11 may have a length Lt in the range of around 530 mm to 630 mm, a width Wt1 of around 50 mm at the tip end 3 of the shell and a width Wt1 of around 100 mm at the root end 4 of the shell 1. In addition, at the tip end 3 of the shell 1 Wt1 may be slightly greater such that a Radius R30 is generated at the outer edge of the shell. So, the tip of the blade is very well enclosed and thus protected from erosion, see FIG. 11 showing a tip shell (soft tip shell).

Enclosing the tip of the blade is an option, as also shown in FIG. 12. Better transition of the tip. One unique shell could be used for the tip end.

As an alternative, the tip shell 1, may be designed to leave the tip of the blade 30 blank, that means not covered, see FIG. 12.

Advantages

Compared to coating and tape solutions embodiments of this invention offers a method that can be done in one working step Having a peel height enables the shells to be drapable. The peel height is achieved during the manufacturing of the shell. Each shell will be moulded as one piece.

Another advantage of casting the shells is that each shell can be tailored

Cost and repair reduced.

The length of at least one of the first and second protective cover (1, 2) may amount to about 2000 mm at maximum, to about 1000 mm.

Advantage: good length blade, in view of operational window (1.7 m). w/o repositioning worker himself.

Method for mounting a protective cover system (10) to a leading edge (59) of a wind turbine blade (55), the method comprises the steps of:

Providing a wind turbine blade (55), the protective cover system (10) and an adhesive;

Applying the adhesive on the wind turbine blade (55) and/or on an inner surface (12) of the first and the second protective covers (1, 2);

Placing the first and the second protective covers (1, 2) onto the wind turbine blade (55), wherein the first and the second overlap portions (4a, 3a) of the protective covers (1, 2) are arranged such that the first and the second overlap portions (3a, 4a) overlap;

Optionally, applying further adhesive between the first and the second overlap portions (4a, 3a); and Allowing the adhesive to firmly connect the first and the second protective covers (1, 2) to the wind turbine blade (55).

The protective cover system (10) further comprising a first set of protective covers, each of the protective covers of the first set of protective covers corresponds to a true copy of said first protective cover (1), a second set of protective covers, each of the protective covers of the second set of protective covers corresponds to a true copy of said second protective cover (2), a protective tip cover, and a protective root cover.

It is possible for some blades that first set is a true copy of second set, depending on a shape and/or shorter length, and depending on repair length.

The protective cover system, wherein the LE radius of the first protective cover (1) is different from the LE radius of the second protective cover (2).

bending rate→LE radius more open curvature vs., more closed curvature only 4 diff cover types→.

The protective cover system, wherein the first protective cover 1 has a chord length corresponding to a chord length of the blade between 0.5 (2 m from tip/1 m-3 m) and 1.3 (12 m from tip/pref. 9-24 m/more pref. 10-14 m) meters and the second protective cover 2 has a chord length corresponding to the chord length of the blade of about 1.3 meters or more.
Outer ⅓ (−½ to) of the length of LE—50%/50% for diff. sets of shells.

The protective cover system, wherein the first protective cover (1) has a chord length between 0.5 and 1.3 meters and the second protective cover (2) has a chord length of about 1.3 meters or more.

The protective cover system, wherein the protective tip cover has a swept end to cover and fit the blade tip.

Pre-bend—more curved than other shells
not exact copy of blade tip but more curved—so it is stretched when mounted to the blade
Valid for all shells, but more exaggerated for tip shell
Tip covered or not covered/
open tip—easier fit to all variations of blade tips, but less erosion protection performance than closed one
close tip—better protection, but requires little variance in blade tips therefore more shell variants are needed.

The protective cover system, wherein the protective root cover features a smooth transition towards the leading edge on the root side.

root end w/o overlap portion, w/o pin hole
smooth transition towards the leading edge on the root side.
Option: No root shell
Advantages:
Compared to a rigid protection shell that can be only mounted on a predefined part of the leading-edge surface, the material of which the protective covers according to embodiments of the present invention are built has a certain flexibility which allows their mounting along a much greater surface area along the leading-edge. As a result, the total number of individually designed protective covers can be reduced to a strict minimum. The resulting economic advantages with respect to production costs and logistic are quite obvious and important. Since in many cases, the surface shape along the leading-edge of a wind turbine blade changes only smoothly, it's even possible to use just two different sets of protective covers, plus a protective tip cover and a protective root cover. It is even possible to do with just two one set of protective covers, plus a protective tip cover.

As stated before, the surface shape, and more precisely the leading-edge radius, along the leading-edge of a wind turbine blade changes only smoothly. Therefore, the same manufacturing process can be used to build the protective covers of the different sets. Same 3D-mould may be used for multiple blades types. This is be advantageously used to reduce furthermore the associated production costs.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A protective cover system for protecting a leading edge of a wind turbine rotor blade from erosion, the system comprising:
    a first protective cover and a second protective cover, both comprising a polymer and being pre-formed into a curved shape so as to accommodate at least a part of the wind turbine rotor blade to be protected, wherein each of the first protective cover and the second protective cover has a tip end and a root end;
    wherein the first protective cover comprises a first overlap portion at the root end, and the second protective cover comprises a second overlap portion at the tip end;
    wherein a shape of the first overlap portion is substantially complementary to a shape of the second overlap portion such that when overlapping the first overlap portion and the second overlap portion, a resulting cross section of the overlapped overlap portions substantially corresponds to cross sections of at least one of the first protective cover and the second protective cover outside the overlap portions;
    wherein one of the first protective cover and the second protective cover comprises a protruding element in the respective first overlap portion or the second overlap portion and the other one of the first protective cover and the second protective cover comprises a recess in the other respective first overlap portion or the second overlap portion, the recess configured to accommodate the protruding element for guiding the first protective cover and the second protective cover when being mounted to the wind turbine rotor blade;
    wherein the recess is a through hole extending through the first overlap portion or the second overlap portion, and the protruding element is shaped to be insertable within the through hole.

2. The protective cover system according to claim 1, wherein at least one of the protective covers comprise an elastomer comprising polyurethane or polyethylene.

3. The protective cover system according to claim 1, wherein a length of at least one of the first and second protective cover amounts to 2000 mm at maximum.

4. A wind turbine blade comprising the protective cover system according to claim 1, wherein the protective cover system is connected to the wind turbine blade along a leading edge of the blade.

5. A method for mounting the protective cover system according to claim 1 to a leading edge of a wind turbine blade, the method comprising:
    providing a wind turbine blade, the protective cover system according to claim 1, and an adhesive;
    applying the adhesive on the wind turbine blade and/or on an inner surface of the first and the second protective covers;
    placing the first and the second protective covers onto the wind turbine blade, wherein the first and the second overlap portions of the protective covers are arranged such that the first and the second overlap portions overlap;
    applying further adhesive between the first and the second overlap portions; and
    allowing the adhesive to connect the first and the second protective covers to the wind turbine blade.

6. The protective cover system according to claim 1 further comprising
    a first set of protective covers, each of the protective covers of the first set of protective covers correspond to a true copy of said first protective cover,
    a second set of protective covers, each of the protective covers of the second set of protective covers corresponds to a true copy of said second protective cover,
    a protective tip cover, and
    a protective root cover.

7. The protective cover system according to claim 6, wherein the protective tip cover has a swept end to cover and fit the blade tip.

8. The protective cover system according to claim 6, wherein the protective root cover features a smooth transition towards the leading edge on the root side.

9. The protective cover system according to claim 1, wherein a leading edge radius of the first protective cover is different from a leading edge radius of the second protective cover.

* * * * *